Jan. 18, 1938. R. M. PARSONS 2,105,499
METHOD AND APPARATUS FOR TREATING CRACKED HYDROCARBON OILS
Filed March 2, 1935
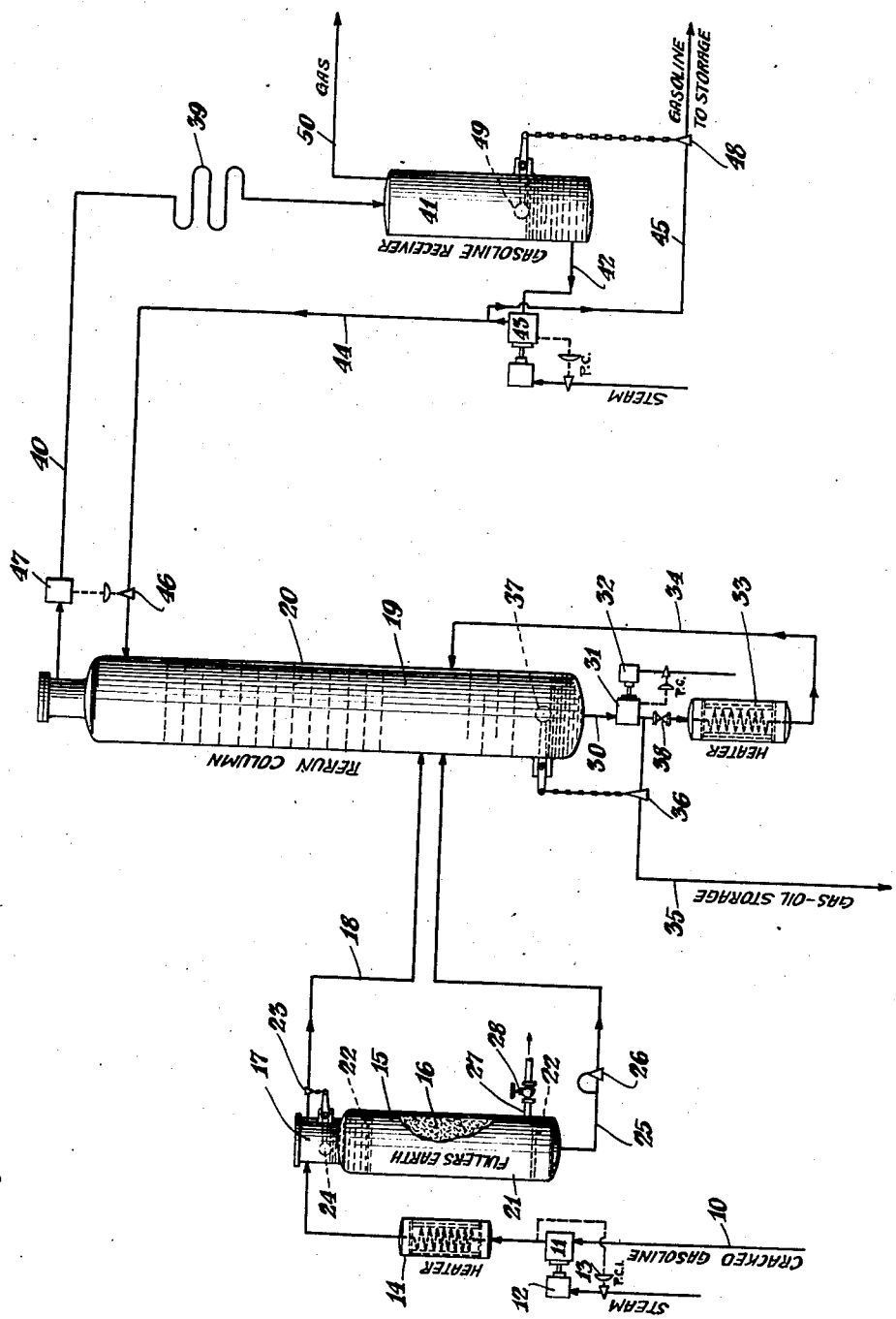
INVENTOR
Ralph M. Parsons
BY
ATTORNEY Patented Jan. 18, 1938

2,105,499

UNITED STATES PATENT OFFICE 2,105,499

METHOD AND APPARATUS FOR TREATING CRACKED HYDROCARBON OILS

Ralph M. Parsons, Mount Vernon, Ohio, assignor to The Ralph M. Parsons Company, Mount Vernon, Ohio, a corporation of Delaware Application March 2, 1935, Serial No. 8,992

2 Claims. (Cl. 196—94)

This invention relates to oil refining and more particularly to the treatment of cracked hydrocarbon oils to improve the characteristics thereof.

Gasoline produced by cracking processes contains unsaturated hydrocarbons which impart desirable anti-knock qualities thereto. It may also contain some unstable, unsaturated hydrocarbons which tend to combine or polymerize to form undesirable constituents of higher molecular weight, or polymers, having for example the consistency of heavy liquids, gums, resins, and the like. It is accordingly desirable to treat the gasoline from the cracking unit so as to remove the polymers and polymer forming constituents. This is commonly accomplished by treating the gasoline with an absorptive catalyst capable of promoting the polymerization of the unstable constituents and removing the polymers thus produced.

An object of this invention is to provide a simple, convenient, dependable and efficient system for the treatment above mentioned.

A feature of the invention consists in the separation of the gasoline received from the cracking unit into vapor and liquid constituents under conditions such that the unstable, unsaturated hydrocarbons are concentrated in the liquid portion; the passage of the vapor directly to the rerun column; and the treatment of the liquid by a suitable absorptive catalyst, such as fuller's earth, prior to the passage to the rerun column.

Another feature consists in the control of the temperatures in the rerun column by recirculation of selected fractions.

Various other objects and features will be apparent as the nature of the invention is more fully disclosed.

Although the various novel features which are believed to be characteristic of this invention will be more particularly pointed out in the claims appended hereto, the invention itself, as to its objects and advantages and the manner of its organization, will be better understood by referring to the embodiment thereof shown in the accompanying drawing and described herein for purposes of illustration.

In the drawing, the figure is a diagrammatic representation of a treating unit embodying the present invention.

For ease of description specific terms will be used to designate various details of the invention. It is to be understood however that these terms are to be given as broad an interpretation as the state of the art will permit.

In the system shown in the drawing the cracked gasoline from the cracking unit, either from the fractionating column or from a gasoline separator, is received for treatment through a line 10. This constitutes the charging stock for the treating unit to be described.

The cracked gasoline is led by the line 10 to a constant pressure pump 11, driven for example by a steam engine 12, the steam supply to which is regulated by a control 13 in accordance with the discharge pressure so as to maintain the same substantially constant at a value suitable for the treating step to be described, for example a pressure of 100 to 500 pounds per sq. in. The gasoline then is passed through a heater 14, which may comprise a heat exchanger or the tubes of a furnace, wherein it is raised to the required temperature for treating, for example a temperature of 300° to 500° F. Obviously, if the gasoline is received from the cracking unit at the required temperature the heating step may be omitted or modified.

The gasoline, at the required temperature and pressure, is then applied to a treating column 15, having a compartment 21 which may contain any desired substance 16 having properties suitable for degumming and polymerization, for example fuller's earth, bauxite, activated clays or the like. The substance 16 may be held by perforate walls 22 forming the compartment 21. The column 15 is provided with a chamber 17 above the compartment 21 and adapted to receive the vapor that separates from the liquid gasoline at the conditions of temperature and pressure involved. The vapor is removed through a line 18 and is applied to a suitable point in a rerun column 19 which may contain a plurality of bubble trays 20 adapted to separate the gasoline from the lower boiling constituents. The line 18 may be controlled by a float operated valve 23, actuated in accordance with a float 24 to close when the liquid level rises above a predetermined point so as to prevent passage of any liquid through the line 18.

The liquid phase is caused to pass through the substance 16 within the compartment 21. This substance acts as a catalyst to promote the polymerization of any unstable, unsaturated constituents to form gums, resins or the like which form a sludge at the bottom of the treating compartment 21. The sludge remaining in the compartment 21 may be removed from time to time together with some of the substance 16 through a pipe 27 controlled by a valve 28. The catalyst thus removed may be replenished as required.

The catalyst may be reactivated or cleaned whenever necessary.

The liquid may remain in contact with the catalyst a sufficient length of time for the polymerization and degumming to be completed. Thereafter the liquid, containing the polymers which have passed through the lower wall 22, is removed from the bottom of the treating column through a line 25, the pressure is reduced in a pressure reduction valve 26 to a value such that a substantial portion thereof vaporizes, and liquid and vapor are passed to the rerun column 19 wherein the vapor bubbles upwardly through the bubble trays 20 at constantly decreasing temperatures.

The temperature in the lower part of the rerun column 19 is preferably such that heavy constitutents such as the polymers, separate out as a liquid and collect at the bottom of said column. In order to maintain this temperature the liquid may be heated and a portion thereof recirculated. For this purpose the liquid may be removed from the bottom of the rerun column 19 through a line 30 by means of a constant pressure pump 31, driven for example by a steam engine 32, the steam supply to which is controlled in accordance with the output pressure of said pump.

A portion of this liquid is discharged by the pump 31 through a valve 38 to a heater 33, which may comprise a heat exchanger or the like, wherein it is raised to the temperature required. The heated liquid is recirculated to the rerun column through a line 34.

The remainder of the liquid removed from the column 19 is passed to storage from the pump 31 through a line 35 controlled by a float operated valve 36 which is actuated by a float 37 within the rerun column 19 so as to maintain a substantially constant liquid level therein. The valve 38 maintains a back pressure so that controlled quantities of liquid may be forced to storage through the line 35.

The uncondensed vapors pass out of the rerun column 19 through a line 40 which leads to a cooler 39 such as a heat exchanger, thence to a gasoline receiver 41 in which the gasoline constituent separates out as a liquid and may be removed through a line 42. A constant pressure pump 43, similar to the pump 31, may receive the gasoline from the line 42 and may discharge through a line 44 into the top of the rerun column 19 and through a line 45 leading to storage. The flow through the line 44 may be controlled by a valve 46 operated in accordance with a temperature responsive device 47 associated with the line 40 so as to maintain the desired temperature at the top of the rerun column. A float operated valve 48, actuated by a float 49 within the gasoline receiver 41, may be included in the line 45 and may be adapted to regulate the passage of gasoline to storage so as to maintain a substantially constant liquid level in said receiver. The uncondensed vapors or gas may be removed from the gasoline receiver 41 through a line 50.

In the operation of this system the treating chamber 21 may, for example, be filled with fuller's earth. The cracked gasoline from the cracking unit is applied to the treating column under conditions of temperature and pressure such that a substantial quantity of vapor separates from the liquid, the latter containing practically all of the unstable constituents which are to be removed. The vapors are passed directly to the rerun column without treatment. The liquid is passed through the chamber 21 in contact with the fuller's earth or the like under conditions of time, temperature and pressure, such that the unstable, unsaturated hydrocarbons combine. The liquid gasoline, together with the polymers, passes through the lower wall 22 and is introduced into the rerun column wherein the polymers are separated and are removed to storage through the pipe 25. The substance within the compartment 21 may be replenished or renewed by opening the valve 23 and permitting the same to be flushed out. When necessary the substance 16 may be cleaned or reactivated in known manner.

The removal of the vapor content prior to treatment increases the efficiency of the liquid treatment. This is possible because most of the unsaturated constituents are of a high boiling point. Hence, by the removal of the light fraction in the treating column 15, the unstable compounds or gum forming constituents are concentrated in the liquid portion which is treated for their removal in the manner set forth.

Among the advantages of the liquid phase treatment may be noted; that a smaller quantity of catalyst is required than would be the case if the entire charge were to be passed therethrough; that the removal of a fraction as a vapor reduces the total flow through the catalyst and increases the life thereof; that the catalyst may be flushed out periodically without necessitating reactivation of the entire quantity of catalyst; that only inexpensive apparatus is required; that practically continuous operation is possible; that the vapor is prevented from interfering with the flow of liquid through the column; that more intimate contact between the liquid and the catalyst is obtained; and that the capacity of the treating column is increased.

The temperature control at the top and bottom of the rerun column by means of recirculated hot polymers and recirculated cool gasoline ensures the separation of fractions having the desired characteristics.

It is to be understood that a specific embodiment of the invention has been disclosed for purposes of illustration only. Various changes and modifications will be readily apparent to a person skilled in the art. The invention is accordingly to be limited only in accordance with the following claims when interpreted in view of the prior art.

What is claimed is:

1. The method of treating cracked gasoline for the removal of unstable, unsaturated hydrocarbons, which comprises converting the cracked gasoline into vapor and liquid fractions under conditions of temperature and pressure such that the unstable, unsaturated hydrocarbons are concentrated in the liquid fraction, separating the vapor fraction from the liquid fraction and introducing the vapor fraction directly into a fractionating zone, passing the separated liquid fraction through a polymerizing and degumming material to polymerize the unstable constituents therein, reducing the pressure of the treated liquid to a value such that a substantial portion thereof vaporizes at the temperature received from the treating zone and introducing the liquids and released vapors to said fractionating zone, for fractionation with said vapor fraction, to separate the heavy polymers as a liquid and the gasoline containing constituent as a vapor, and removing and condensing said vapor to separate the gasoline therefrom.

2. A system for the treatment of cracked gasoline for the removal of unstable, unsaturated hydrocarbons, comprising a treating column and a rerun column, said treating column having a compartment containing a polymerizing and degumming substance, a compartment located above said first compartment and separated therefrom by perforated walls to permit passage of liquid therethrough, means converting the cracked gasoline into vapor and liquid fractions under conditions of temperature and pressure such that the unstable, unsaturated hydrocarbons are concentrated in the liquid fraction, means introducing said vapor and liquid fractions into said last compartment at a rate such that a layer of liquid is maintained therein, means withdrawing the vapor fraction from said last compartment without passage through said first compartment, means introducing said vapor fraction into said rerun column for the separation of the heavy constituents therefrom, means withdrawing said liquid fraction from the bottom of said treating column after passage through said first compartment and means introducing the treated liquid fraction into said rerun column for fractionation with said vapor fraction to separate the heavy polymers as a liquid at the bottom of the rerun column and the gasoline as a vapor at the top thereof.

RALPH M. PARSONS.